US012711630B2

(12) United States Patent
Li

(10) Patent No.: US 12,711,630 B2
(45) Date of Patent: Aug. 18, 2026

(54) VIDEO PICTURE RENDERING METHOD AND APPARATUS, DEVICE, AND MEDIUM

(71) Applicant: Tencent Technology (Shenzhen) Company Limited, Shenzhen (CN)

(72) Inventor: Xiang Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 214 days.

(21) Appl. No.: 18/785,103

(22) Filed: Jul. 26, 2024

(65) Prior Publication Data

US 2024/0386574 A1 Nov. 21, 2024

Related U.S. Application Data

(63) Continuation of application No. PCT/CN2023/116670, filed on Sep. 4, 2023.

(30) Foreign Application Priority Data

Oct. 28, 2022 (CN) ........................ 202211335718.7

(51) Int. Cl.

*G06K 9/34* (2006.01)
*G06T 7/11* (2017.01)
*G06T 17/00* (2006.01)

(52) U.S. Cl.

CPC ................ *G06T 7/11* (2017.01); *G06T 17/00* (2013.01)

(58) Field of Classification Search

CPC ......... G06T 7/11; G06T 17/00; G06T 15/005; G06T 17/20; G06T 19/006; G06T 15/00; A63F 13/525; H04N 21/44012

See application file for complete search history.

(56) References Cited

U.S. PATENT DOCUMENTS

2013/0016099 A1* 1/2013 Rinard .................. A63F 13/525 345/422
2017/0243319 A1 8/2017 Wittenbrink et al.

FOREIGN PATENT DOCUMENTS

CN 112001993 A 11/2020
CN 112136094 A * 12/2020 ......... G02B 27/0172
CN 114255315 A * 3/2022 ........... G06T 19/006
CN 114494550 A * 5/2022 ............. G06T 15/04

(Continued)

OTHER PUBLICATIONS

International Search Report for PCT/CN2023/116670 dated Dec. 28, 2023.
Written Opinion for PCT/CN2023/116670 dated Dec. 28, 2023.

*Primary Examiner* — Xin Jia
(74) *Attorney, Agent, or Firm* — Sughrue Mion, PLLC

(57) ABSTRACT

A video picture rendering method, performed by a computer device, includes: obtaining a simulated camera by simulating a virtual camera of a rendering engine; determining a grid patch, a first size of the grid patch matching a second size of a virtual sensor in the virtual camera; determining a positional relationship between a viewpoint of the simulated camera and a plurality of vertexes of the grid patch; determining a rendering region based on the positional relationship; obtaining a video frame picture to be rendered in the rendering region; splitting the video frame picture based on the grid patch, to obtain video sub-pictures; and synchronously rendering the video sub-pictures through preset rendering machines, to obtain a rendering picture corresponding to the video frame picture.

20 Claims, 8 Drawing Sheets

(56) References Cited

FOREIGN PATENT DOCUMENTS

| | | | |
|---|---|---|---|
| CN | 114494559 | A | 5/2022 |
| CN | 114820910 | A | 7/2022 |
| CN | 116485966 | A | 7/2023 |

* cited by examiner

Rendering machine 1

Synchronization card

Rendering sub-picture 1

Rendering sub-picture 2

Virtual sensor (23.76 mm * 13.365 mm)

Rendering machine 2

VIDEO PICTURE RENDERING METHOD AND APPARATUS, DEVICE, AND MEDIUM

CROSS-REFERENCE TO RELATED APPLICATIONS

This application is a continuation application of International Application No. PCT/CN2023/116670 filed on Sep. 4, 2023, which claims priority to Chinese Patent Application No. 202211335718.7, filed with the China National Intellectual Property Administration on Oct. 28, 2022, the disclosures of each being incorporated by reference herein in their entireties.

FIELD

The disclosure relates to video processing technologies, and in particular, to a video picture rendering method and apparatus, a device, and a medium.

BACKGROUND

With development of computer technologies, people have an increasingly higher requirement on quality of a video picture. For example, in the field of gaming, a player may have a high requirement on quality of a game picture. A high-quality video picture may have both a high resolution and a high frame rate. The video picture may be rendered through a rendering machine. Rendering pressure of the rendering machine may be heavy, and an overloaded rendering machine may be unable to meet high-quality requirements for the video picture.

SUMMARY

Provided are a video picture rendering method and apparatus, a device, and a medium are provided.

A video picture rendering method, performed by a computer device, includes: obtaining a simulated camera by simulating a virtual camera of a rendering engine; determining a grid patch, a first size of the grid patch matching a second size of a virtual sensor in the virtual camera; determining a positional relationship between a viewpoint of the simulated camera and a plurality of vertexes of the grid patch; determining a rendering region based on the positional relationship; obtaining a video frame picture to be rendered in the rendering region; splitting the video frame picture based on the grid patch, to obtain a plurality of video sub-pictures; and synchronously rendering the plurality of video sub-pictures through a plurality of preset rendering machines, to obtain a rendering picture corresponding to the video frame picture.

According to some embodiments, a video picture rendering apparatus, includes: at least one memory configured to store computer program code; and at least one processor configured to read the program code and operate as instructed by the program code, the program code including: first obtaining code configured to cause at least one of the at least one processor to obtain a simulated camera by simulating a virtual camera of a rendering engine; first determining code configured to cause at least one of the at least one processor to determine a grid patch, a first size of the grid patch matching a second size of a virtual sensor in the virtual camera; second determining code configured to cause at least one of the at least one processor to determine a positional relationship between a viewpoint of the simulated camera and a plurality of vertexes of the grid patch; third determining code configured to cause at least one of the at least one processor to determine a rendering region based on the positional relationship; second obtaining code configured to cause at least one of the at least one processor to obtain a video frame picture to be rendered in the rendering region; splitting code configured to cause at least one of the at least one processor to split the video frame picture based on the grid patch, to obtain a plurality of video sub-pictures; and rendering code configured to cause at least one of the at least one processor to synchronously render the plurality of video sub-pictures through a plurality of preset rendering machines, to obtain a rendering picture corresponding to the video frame picture.

According to some embodiments, a non-transitory computer-readable storage medium, storing computer code which, when executed by at least one processor, causes the at least one processor to at least: obtain a simulated camera by simulating a virtual camera of a rendering engine; determine a grid patch, a first size of the grid patch matching a second size of a virtual sensor in the virtual camera; determine a positional relationship between a viewpoint of the simulated camera and a plurality of vertexes of the grid patch; determine a rendering region based on the positional relationship; obtain a video frame picture to be rendered in the rendering region; split the video frame picture based on the grid patch, to obtain a plurality of video sub-pictures; and synchronously render the plurality of video sub-pictures, to obtain a rendering picture corresponding to the video frame picture.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Figure 1:
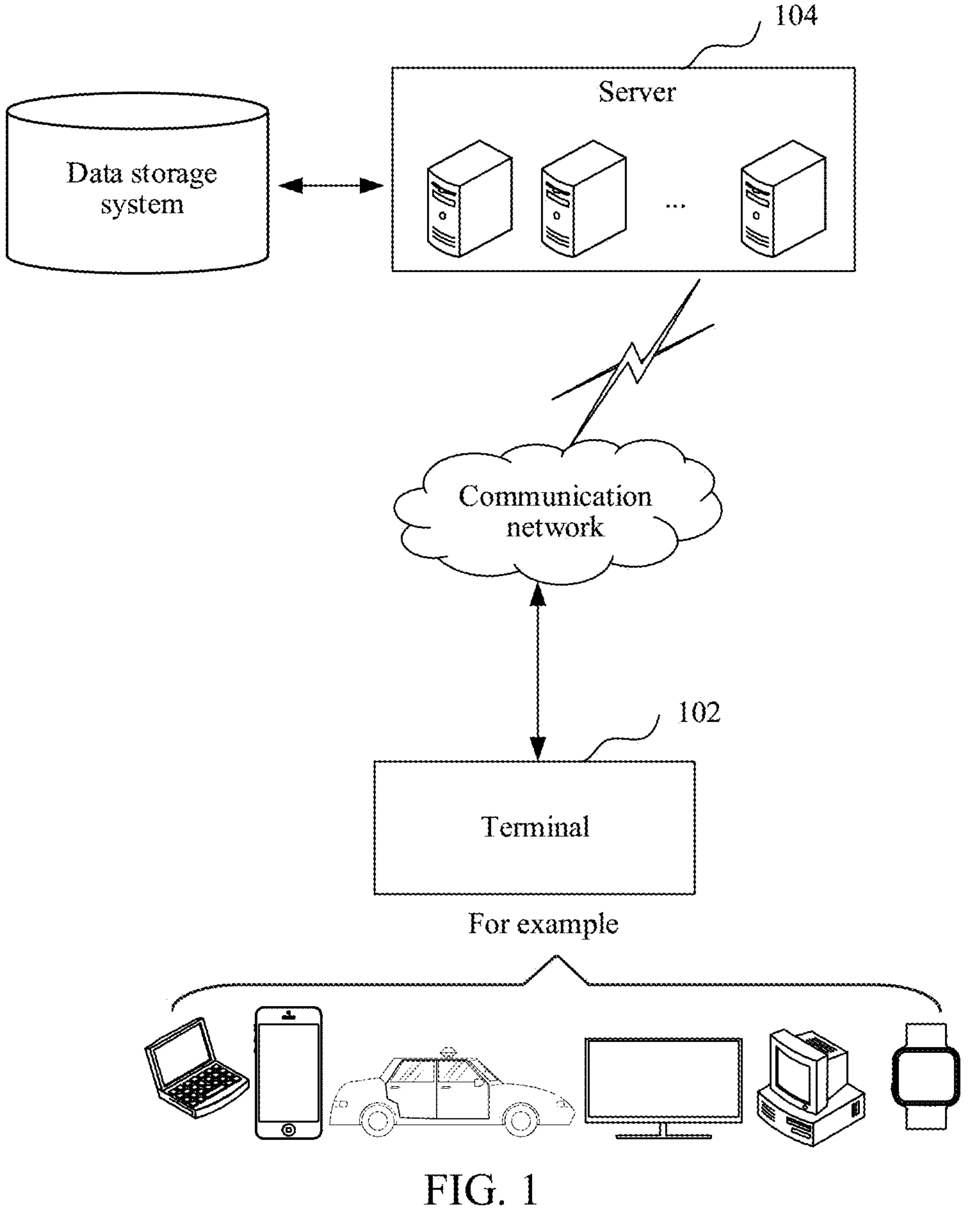
FIG. 1 is a diagram of an application environment of a video picture rendering method according to some embodiments.

The video picture rendering method may be applied to an application environment shown in FIG. 1. For example, a terminal 102 communicates with a server 104 through a network. A data storage system may store data that the server 104 is to process. The data storage system may be integrated on the server 104, or may be placed on a cloud or another server. The terminal 102 may be but is not limited to any desktop computer, notebook computer, smartphone, tablet computer, internet of things device, and portable wearable device. The internet of things device may be a smart speaker, a smart television, a smart air conditioner, a smart vehicle-mounted device, or the like. The wearable device may be a smartwatch, a smart band, a headset, or the like. The server 104 may be an independent physical server, or may be a server cluster or a distributed system including a plurality of physical servers, or may be a cloud server that provides cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 and the server 104 may be connected directly or indirectly in a wireless communication manner or a wired communication manner. This is not limited.

The server 104 may determine a simulated camera, where the simulated camera is obtained by simulating a virtual camera of a rendering engine. The server 104 may determine a grid patch, where a size of the grid patch matches a size of a virtual sensor in the virtual camera. The server 104 may determine a positional relationship between a viewpoint of the simulated camera and each vertex of the grid patch, and determine a rendering region based on the positional relationship. The server 104 may obtain a to-be-rendered video frame picture in the rendering region. The server 104 may split the video frame picture based on the grid patch, to obtain a plurality of video sub-pictures. The server 104 may synchronously render the plurality of video sub-pictures through a plurality of preset rendering machines, to obtain a rendering picture corresponding to the video frame picture. The server 104 may transmit the synthesized rendering picture to the terminal 102 for display. This is not limited. The application scenario in FIG. 1 is an example description and the disclosure is not limited thereto.

Figure 2:
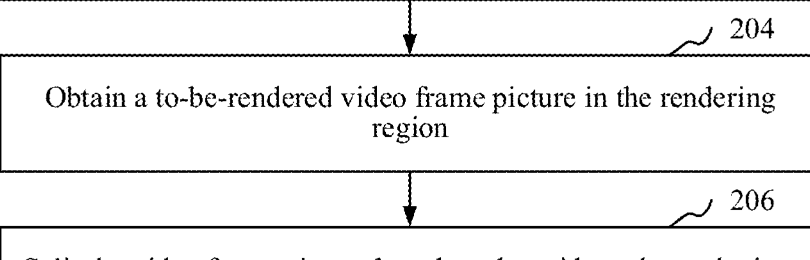
FIG. 2 is a schematic flowchart of a video picture rendering method according to some embodiments.

In some embodiments, as shown in FIG. 2, a video picture rendering method is provided. The method may be applied to a computer device. The computer device may be a terminal or a server, and is separately performed by the terminal or the server, or may be implemented through interaction between the terminal and the server. Some embodiments are described by using an example in which the method is applied to the computer device. The method includes the following operations:

Operation 202: Determine a simulated camera, the simulated camera being obtained by simulating a virtual camera of a rendering engine; determine a grid patch, a size of the grid patch matching a size of a virtual sensor in the virtual camera; and determine a positional relationship between a viewpoint of the simulated camera and each vertex of the grid patch, and determine a rendering region based on the positional relationship.

The rendering engine is a three-dimensional real-time rendering engine for picture rendering, and may be a game engine, such as a fantasy engine. The virtual camera is a virtual camera in the rendering engine. The virtual camera may be configured to implement a function of a physical camera. The simulated camera is a camera obtained by simulating the virtual camera. The simulated camera may have a function of a virtual camera that the simulated camera simulates.

The simulated camera has a viewpoint and a grid patch. The viewpoint may be referred to as an observation point. The same object is observed from different viewpoints, and pictures of the same object at different perspectives may be obtained. The grid patch is a three-dimensional patch constructed based on the size of the virtual sensor in the virtual camera. The three-dimensional patch is in a three-dimensional virtual scenario. A position of the viewpoint of the simulated camera may be determined based on a position of the simulated camera. For example, the position of the simulated camera may be directly used as the position of the viewpoint of the simulated camera, or the position of the viewpoint may be obtained by offsetting the position of the simulated camera based on a preset offset relationship.

The virtual sensor is a virtual sensor in the virtual camera. The virtual sensor has a function of a physical sensor. A size of the virtual sensor may be represented by using a physical size. For example, the size of the virtual sensor may be represented by using a physical size as 23.76 mm*13.365 mm, where mm represents millimeter. That the sizes of the grid patch and the virtual sensor in the virtual camera match may be that the sizes of the grid patch and the virtual sensor in the virtual camera are the same or remain the same ratio.

In some embodiments, the rendering region is a region inside a pyramid when the viewpoint is respectively connected to each vertex of the grid patch to form the pyramid.

The rendering region is a region configured for determining a video frame picture that is to be rendered. The rendering region may be a region inside the pyramid formed from the viewpoint to an edge surrounding the grid patch. The rendering region may be a space occupied in the three-dimensional virtual scenario, and the space is configured for rendering a two-dimensional video picture. The vertex is a point configured for determining the edge of the grid patch, and the same vertex connects different edges of the grid patch. When the grid patch is a rectangle, four right-angle vertexes of the rectangle are vertexes of the grid patch.

In some embodiments, the rendering region is a region inside the pyramid. To-be-rendered content may be accurately determined in the three-dimensional virtual scenario by using the rendering region, so that the to-be-rendered video frame picture may be accurately generated, thereby preparing for ensuring quality of a final rendering picture.

The viewpoint and the vertexes of the grid patch may be used to determine the rendering region. Therefore, the computer device may determine the positional relationship between the viewpoint and each vertex of the grid patch, to determine the rendering region. The positional relationship may be a relative position between the viewpoint and each of the vertexes, for example, may be an offset of each of the vertexes relative to the viewpoint on a plane on which the grid patch is located. The positional relationship may also be represented by respective positions of the viewpoint and each vertex in the three-dimensional virtual scenario.

The computer device may determine the position of the viewpoint and a position of each of the vertexes of the grid patch, to determine the positional relationship between the viewpoint and each vertex of the grid patch, and determine the rendering region by using the positional relationship between the viewpoint and each of the vertexes of the grid patch.

The computer device may determine a pyramid based on the viewpoint and each vertex of the grid patch, and a region inside the pyramid is the rendering region. When the grid patch is a rectangle, the viewpoint is connected to four vertexes of the grid patch to form the pyramid, and an interior of the pyramid is the rendering region.

Figure 3:
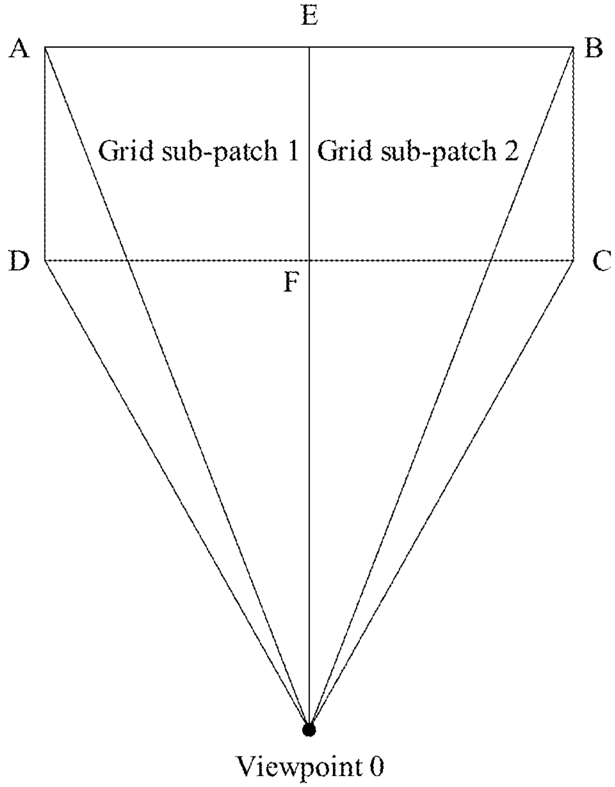
FIG. 3 is a schematic diagram of a positional relationship between a viewpoint and a grid patch according to some embodiments.

For example, as shown in FIG. 3, the computer device may connect the viewpoint O of the simulated camera to each of the vertexes (for example, A, B, C, and D) of the grid patch ABCD respectively, to obtain a square pyramid O-ABCD, and a region inside the pyramid is the rendering region.

Operation 204: Obtain a to-be-rendered video frame picture in the rendering region.

The video frame picture is an image of one video frame in a video or a video stream. The video frame picture may be a real-time picture, and may be a picture of one video frame corresponding to a current moment in a real-time video stream. The video stream includes a plurality of video frames, and the plurality of video frames correspond to a plurality of video frame pictures.

The position of the simulated camera may be a position of the simulated camera in the three-dimensional virtual scenario. The position of the simulated camera corresponds to a position of the viewpoint of the simulated camera. Therefore, the computer device may determine the position of the viewpoint based on the position of the camera, to determine a spatial position of the rendering region in the three-dimensional virtual scenario, so that the video frame picture may be determined based on content in the rendering region. The computer device may project the three-dimensional content in the rendering region onto a two-dimensional grid patch, to obtain the to-be-rendered video frame picture.

In some embodiments, the obtaining a to-be-rendered video frame picture in the rendering region includes: obtaining the position of the simulated camera, and determining the to-be-rendered video frame picture in the rendering region based on the position of the virtual The computer device may obtain the position of the simulated camera at a current moment, and determine the to-be-rendered real-time video frame picture in the rendering region based on the position of the virtual camera at the current moment.

Further, the computer device may obtain the position of the simulated camera at the current moment, and determine the position of the viewpoint of the simulated camera at the current moment based on the position of the simulated camera at the current moment, to determine content of the rendering region at the current moment in the three-dimensional virtual scenario, and determine the to-be-rendered real-time video frame picture in the rendering region based on the content.

In some embodiments, the to-be-rendered video frame picture in the rendering region may be accurately determined by using the position of the simulated camera, thereby preparing for ensuring the quality of the final rendering picture.

In some embodiments, the computer device may obtain the position of the virtual camera, and determine the position of the simulated camera based on the position of the virtual camera. The computer device may use the position of the virtual camera as the position of the simulated camera. The computer device may further adjust the position of the virtual camera, for example, offset based on the preset offset relationship, and use a position after the offset as the position of the simulated camera.

Operation 206: Split the video frame picture based on the grid patch, to obtain a plurality of video sub-pictures.

The video sub-picture is a video picture obtained by performing regional splitting on the video frame picture. The plurality of video sub-pictures obtained through splitting are independent of each other and can be merged into the video frame picture. The computer device may determine a size of the video frame picture based on the size of the grid patch, determine a splitting manner based on the size of the grid patch, and split the video frame picture based on the splitting manner, to obtain the plurality of video sub-pictures.

The video frame picture may be split in a preset splitting manner, or may be split in a splitting manner determined instantly. The splitting manner may be even splitting or may be uneven splitting. If the video sub-pictures are unevenly split, sizes of some video sub-pictures may be the same, sizes of some video sub-pictures may be different, or sizes of all video sub-pictures may be different.

In some embodiments, the computer device may spatially split, for each real-time video frame picture, the rendering region corresponding to the video frame picture based on the grid patch, to obtain a plurality of sub-regions. Further, the computer device may determine to-be-rendered real-time picture content in each of the sub-regions respectively, and obtain the plurality of video sub-pictures based on the to-be-rendered real-time picture content in each of the sub-regions. The spatially splitting the video frame picture is to split the video frame picture from a picture dimension. The video sub-pictures obtained through splitting can be rendered separately.

Operation 208: Synchronously render the plurality of video sub-pictures through a plurality of preset rendering machines, to obtain a rendering picture corresponding to the video frame picture.

The rendering machine may be a computer program configured in the computer device for performing rendering tasks. The rendering machine may also be a computer device configured to perform rendering tasks. The synchronously rendering the plurality of video sub-pictures through the plurality of preset rendering machines means that the plurality of rendering machines perform the rendering tasks in parallel, to render the plurality of video sub-pictures in parallel. A quantity of rendering machines may be the same as a quantity of video sub-pictures, or may be different from a quantity of video sub-pictures. The rendering picture is a picture obtained by rendering the video frame picture. The rendering picture may be displayed through a display unit of the computer device or an independent display device.

In some embodiments, the plurality of rendering machines may synchronously render the plurality of video sub-pictures to obtain a plurality of rendering sub-pictures in one-to-one correspondence to the plurality of video sub-pictures. The plurality of rendering sub-pictures form the rendering picture corresponding to the video frame picture. Each of the rendering sub-pictures is a picture obtained by rendering a corresponding video sub-picture. Each of the rendering machines may be configured to render at least one video sub-picture. The rendering machine has a network address, and the rendering machine may render a video sub-picture having a preset mapping relationship with the network address thereof.

In some embodiments, the plurality of rendering machines may synchronously render the plurality of video sub-pictures, to obtain the plurality of rendering sub-pictures in one-to-one correspondence to the plurality of video sub-pictures, and splice the plurality of rendering sub-pictures based on a positional relationship between the plurality of video sub-pictures, to obtain the rendering picture corresponding to the video frame picture.

The computer device that performs operation 202 to operation 206 may be one of the plurality of rendering machines, and may be referred to as a primary rendering machine. In some embodiments, the primary rendering machine may coordinate a secondary rendering machine in the plurality of rendering machines, so that the primary rendering machine and the secondary rendering machine synchronously render the plurality of video sub-pictures. The computer device that performs operation 202 to operation 206 may be a device independent of any rendering machine. In some embodiments, the computer device may indicate the plurality of rendering machines to synchronously render the plurality of video sub-pictures.

In some embodiments, when the quantity of rendering machines is the same as the quantity of video sub-pictures, a position of a video sub-picture rendered by each rendering machine relative to the video frame picture may be fixed. For example, there are four rendering machines, numbered 1, 2, 3, and 4. Each video frame picture is split into four video sub-pictures, numbered I, II, III, and IV based on positions. The rendering machine 1 may render the video sub-picture at the position I in a fixed manner, the rendering machine 2 may render the video sub-picture at the position II in a fixed manner, the rendering machine 3 may render the video sub-picture at the position III in a fixed manner, and the rendering machine 4 may render the video sub-picture at the position IV in a fixed manner.

In some embodiments, when the quantity of rendering machines is less than the quantity of video sub-pictures, at least one rendering machine in the plurality of rendering machines may render at least two video sub-pictures at the same moment. The rendering machine that renders the at least two video sub-pictures at the same moment may be a fixed rendering machine in the plurality of rendering machines, for example, a rendering machine having stronger computing performance than a rendering machine that renders one video sub-picture at the same moment. At a next moment, the rendering machine that renders the at least two video sub-pictures at the same moment may be the rendering machine that renders one video sub-picture at the same moment. The rendering machine that renders the at least two video sub-pictures at the same moment may be selected from the plurality of rendering machines in turn, or may be selected based on a load situation.

In some embodiments, when the quantity of rendering machines is greater than the quantity of video sub-pictures, each rendering machine may render one video sub-picture at the same moment. The rendering machine that does not render the video sub-picture is an idle rendering machine, and the idle rendering machines at different moments may be the same or different.

In the video picture rendering method, the video frame picture is split through the grid patch whose size matching the size of the virtual sensor in the virtual camera, and sub-pictures obtained through splitting are rendered synchronously through the plurality of preset rendering machines, so that a high-quality rendering picture can be obtained efficiently, thereby meeting a rendering requirement on a scenario with high picture quality and rendering efficiency. For example, when the video picture rendering method is used, compared with other methods, a larger picture size may have a more prominent effect. In some embodiments, for a scenario having a high requirement on real-time performance, such as a scenario in which a real-time video picture is rendered, the high requirement on real-time performance of the video picture rendering may be met by using the video picture rendering method. For a screen arranged inside or outside a building site, for example, a commercial giant screen, an effect is particularly prominent by using the video picture rendering method.

In some embodiments, the virtual camera is in the three-dimensional virtual scenario, and the position of the simulated camera is determined based on the position of the virtual camera in the three-dimensional virtual scenario. The determining the to-be-rendered video frame picture in the rendering region based on the position of the virtual camera includes: determining real-time scenario content in the rendering region in the three-dimensional virtual scenario based on the position of the simulated camera, to obtain to-be-rendered real-time video frame picture.

In some embodiments, the position of the simulated camera is determined based on the position of the virtual camera in the three-dimensional virtual scenario, and the determining the to-be-rendered real-time video frame picture in the rendering region based on the position of the simulated camera includes: determining the real-time scenario content in the rendering region in the three-dimensional virtual scenario based on the position of the simulated camera, to obtain the to-be-rendered real-time video frame picture.

The computer device may determine the position of the simulated camera based on the position of the virtual camera in the three-dimensional virtual scenario, and determine the real-time scenario content in the rendering region in the three-dimensional virtual scenario based on the position of the simulated camera, to obtain the to-be-rendered real-time video frame picture. The real-time scenario content in the rendering region in the three-dimensional virtual scenario may be rendered, for example, the real-time scenario content is visible. Real-time scenario content outside the rendering region in the three-dimensional virtual scenario is not rendered, for example, the real-time scenario content is invisible.

In some embodiments, the real-time scenario content in the rendering region in the three-dimensional virtual scenario is determined by using the position of the simulated camera, to obtain the to-be-rendered real-time video frame picture, so that a rendering speed of the video frame picture may be increased.

In some embodiments, the grid patch includes a plurality of grid sub-patches, common vertexes of two adjacent grid sub-patches in the plurality of grid sub-patches have same coordinates, and the splitting the video frame picture based on the grid patch, to obtain a plurality of video sub-pictures includes: spatially splitting, for each video frame picture, the rendering region corresponding to the video frame picture based on the common vertexes of the plurality of grid sub-patches, to obtain a plurality of sub-regions; and determining real-time scenario content in each of the sub-regions in the three-dimensional virtual scenario, and determining the real-time scenario content in each of the sub-regions as the video sub-picture respectively.

The common vertexes are common grid vertexes between two grid sub-patches. The sub-region is a region obtained by spatially splitting the rendering region.

For each video frame picture, the computer device may spatially split the rendering region corresponding to the video frame picture based on the common vertexes of the plurality of grid sub-patches, to obtain the plurality of sub-regions. Further, the computer device may determine the real-time scenario content in each of the sub-regions in the three-dimensional virtual scenario, and determine real-time scenario content in each of the sub-regions obtained through splitting as the video sub-picture. The rendering machine has the network address, the network address of the rendering machine corresponds to the grid sub-patch, and the rendering machine may render the video sub-picture having the preset mapping relationship with the network address thereof.

In some embodiments, still referring to FIG. 3, the grid patch includes two grid sub-patches, for example, a grid sub-patch AEFD (for example, a grid sub-patch 1) and a grid sub-patch EBCF (for example, a grid sub-patch 2). The grid sub-patch AEFD and the grid sub-patch EBCF are two adjacent grid sub-patches that have two common vertexes, for example, a vertex E and a vertex F. The computer device may spatially split the rendering region corresponding to the video frame picture based on the common vertexes E and F of the grid sub-patch AEFD and the grid sub-patch EBCF, to obtain two sub-regions, for example, a square pyramid O-AEFD and a square pyramid O-EBCF. The real-time scenario content in the square pyramid O-AEFD and the square pyramid O-EBCF is the video sub-picture.

In some embodiments, the rendering region corresponding to the video frame picture is spatially split through the common vertexes of the plurality of grid sub-patches, to ensure that a complete picture can be finally synthesized through seamless splicing. Further, an accuracy rate of obtaining the video sub-picture may be improved by determining that the real-time scenario content in sub-regions obtained through splitting is the video sub-picture.

In some embodiments, the video picture rendering method further includes: determining a focal length of the virtual camera; determining a distance between the viewpoint of the simulated camera and the grid patch based on the focal length; and determining the positional relationship between the viewpoint and each vertex of the grid patch based on the distance.

The computer device may determine the distance between the viewpoint and the grid patch based on the focal length of the virtual camera in the rendering engine; and obtain a relative positional relationship between the viewpoint and each vertex of the grid patch based on the distance.

Further, the computer device may determine the focal length of the virtual camera, and determine the distance between the viewpoint and the grid patch based on the focal length of the virtual camera in the rendering engine. Further, the computer device may obtain the relative positional relationship between the viewpoint and each vertex of the grid patch based on the distance.

In some embodiments, the computer device may perform an operation on the focal length of the virtual camera in the rendering engine, and use a calculated distance as the distance between the viewpoint and the grid patch.

In some embodiments, the computer device may directly use the focal length of the virtual camera in the rendering engine as the distance between the viewpoint and the grid patch.

In some embodiments, the simulated camera is obtained by simulating the virtual camera based on a display component, and the distance between the viewpoint and the grid patch in the simulated camera is determined based on the focal length of the virtual camera. The display component is a component in the rendering engine for picture rendering.

Figure 4:
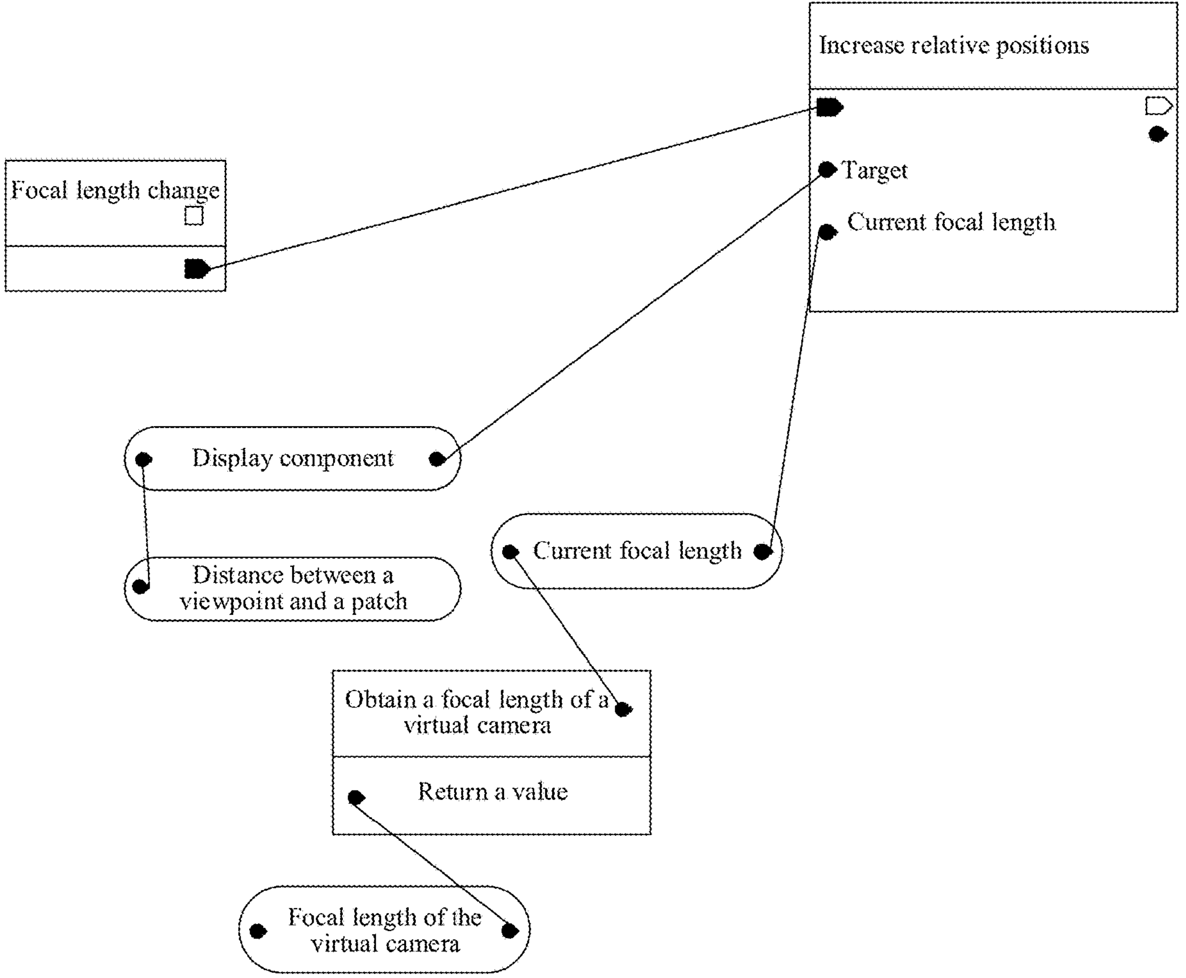
FIG. 4 is a schematic diagram of a principle of determining a distance between a viewpoint and a grid patch based on a focal length of a virtual camera according to some embodiments.

As shown in FIG. 4, the computer device may obtain a current focal length of the virtual camera, and use the obtained current focal length of the virtual camera as the distance between the viewpoint and the grid patch in the simulated camera. Once the focal length of the virtual camera changes, the distance between the viewpoint and the grid patch in the simulated camera also changes accordingly.

In some embodiments, the distance between the viewpoint and the grid patch is determined based on the focal length of the virtual camera in the rendering engine, and relative positions between the viewpoint and each vertex of the grid patch are obtained based on the distance, to improve an accuracy rate of the relative positions between the viewpoint and each vertex of the grid patch. A more accurate rendering region may be obtained.

In some embodiments, the simulated camera is obtained by simulating through the display component, and the video picture rendering method further includes: determining the position of the virtual camera; and assigning the position of the virtual camera to the display component, to obtain the position of the simulated camera. The display component is a component in the rendering engine for picture rendering.

In some embodiments, the simulated camera is obtained by simulating through the display component, the display component is a parent of the viewpoint and the grid patch, and the video picture rendering method further includes: determining the position of the virtual camera; and assigning the position of the virtual camera to the display component, to obtain the position of the simulated camera. If the display component is the parent of the viewpoint and the grid patch, the display component may have attributes of the viewpoint and the grid patch, the position of the virtual camera is assigned to the display component, and the position of the simulated camera, the viewpoint, and the grid patch may be determined.

In some embodiments, the computer device may simulate the virtual camera through the display component, to obtain the simulated camera. The computer device may determine the position of the virtual camera, and assign the position of the virtual camera to the display component, to obtain the position of the simulated camera.

Figures 5, 6:
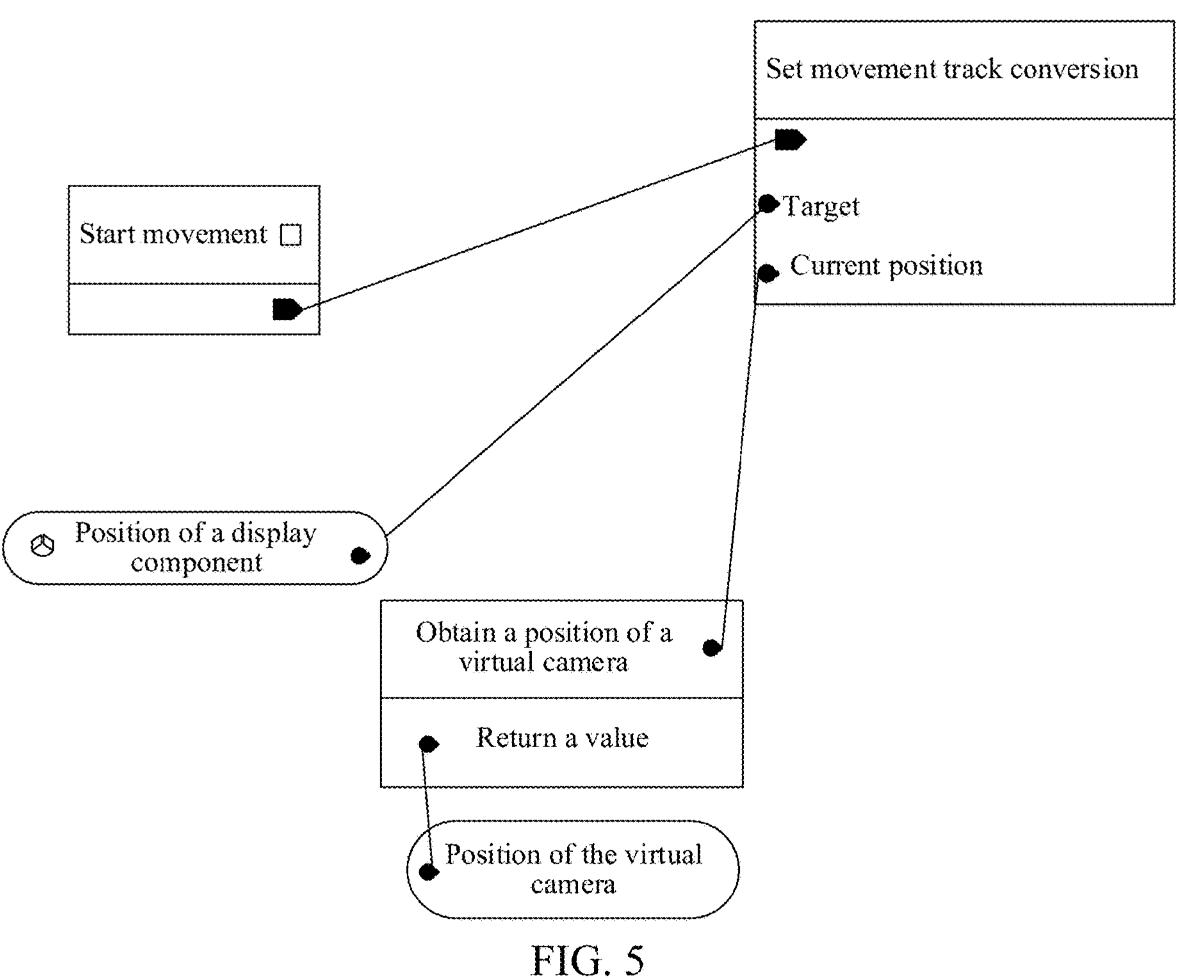
FIG. 5 is a schematic diagram of a principle of determining a position of a simulated camera based on a position of a virtual camera according to some embodiments.
FIG. 6 is a schematic diagram of a principle of performing segmenting and modeling and performing distributed rendering based on a size of a virtual sensor according to some embodiments.

In some embodiments, because the simulated camera is obtained by simulating the virtual camera based on the display component, the position of the simulated camera in the three-dimensional virtual scenario is determined based on the position of the virtual camera in the three-dimensional virtual scenario. As shown in FIG. 5, the computer device may obtain the position of the virtual camera, and use the obtained position of the virtual camera as the position of the simulated camera. Once the position of the virtual camera in the three-dimensional virtual scenario changes, the position of the simulated camera in the three-dimensional virtual scenario also changes accordingly.

In some embodiments, the position of the virtual camera is assigned to the display component, to obtain the position of the simulated camera, so that the simulated camera may simulate movement of the virtual camera. A more accurate video frame picture may be obtained.

In some embodiments, the synchronously rendering the plurality of video sub-pictures through a plurality of preset rendering machines, to obtain a rendering picture corresponding to the video frame picture includes: synchronously rendering the plurality of video sub-pictures through the plurality of preset rendering machines, to obtain rendering sub-pictures respectively corresponding to the plurality of video sub-pictures; and synthesizing the rendering sub-pictures respectively corresponding to the plurality of video sub-pictures, to obtain the rendering picture corresponding to the video frame picture.

The plurality of rendering machines may be preset in the computer device. The computer device may synchronously render the plurality of video sub-pictures through the plurality of preset rendering machines, to obtain the rendering sub-pictures respectively corresponding to the plurality of video sub-pictures. Each of the rendering machines may be responsible for rendering at least one video sub-picture.

In some embodiments, the plurality of rendering machines may receive a synchronization rendering signal and a rendering instruction respectively, and control, based on the synchronization rendering signal and the rendering instruction, the plurality of rendering machines to synchronously render the plurality of video sub-pictures respectively, to obtain the rendering sub-pictures respectively corresponding to the plurality of video sub-pictures.

A picture synthesizer may be a computer program or a computer device that synthesizes the rendering sub-pictures respectively corresponding to the plurality of video sub-pictures, to obtain the rendering picture corresponding to the video frame picture. The picture synthesizer may be one of the plurality of rendering machines, for example, a primary rendering machine. The picture synthesizer may also be a computer device independent of any rendering machine.

The picture synthesizer may be deployed on the computer device in advance. The computer device may receive, through the picture synthesizer, the rendering sub-pictures respectively corresponding to the plurality of video sub-pictures outputted by the rendering machines, and synthesize the rendering sub-pictures respectively corresponding to the plurality of video sub-pictures, to obtain the rendering picture corresponding to the video frame picture.

In some embodiments, the size of the virtual sensor is represented by using the physical size, and the video picture rendering method further includes: performing modeling based on the size of the virtual sensor and the quantity of rendering machines, to obtain the plurality of grid sub-patches.

In some embodiments, a quantity of grid sub-patches is consistent with the quantity of rendering machines, and a sum of areas of the plurality of grid sub-patches is consistent with an area of the virtual sensor.

A size of the grid sub-patch is obtained by evenly dividing based on the physical size of the virtual sensor.

In some embodiments, as shown in FIG. 6, the size of the virtual sensor is represented as the physical size: 23.76 mm*13.365 mm, and the quantity of rendering machines is two. In some embodiments, the computer device may obtain two grid sub-patches having physical sizes of 11.88 mm*13.365 mm respectively by modeling. The computer device may synchronously render video sub-pictures respectively corresponding to the two grid sub-patches through a rendering machine 1 and a rendering machine 2, to obtain a rendering sub-picture 1 and a rendering sub-picture 2.

Figure 7:
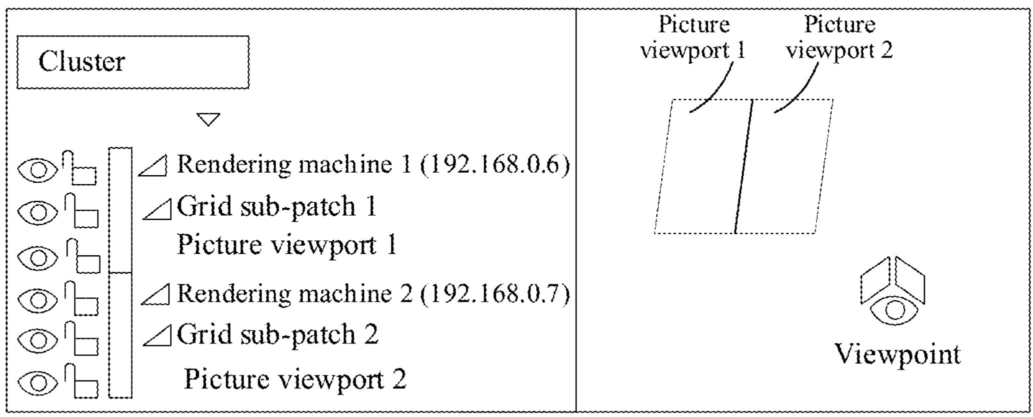
FIG. 7 is a schematic diagram of a mapping relationship between rendering machines, grid sub-patches, and picture viewports according to some embodiments.

In some embodiments, as shown in FIG. 7, the computer device may preset a network address of a rendering machine, and a mapping relationship between grid sub-patches and picture viewports in the rendering machine. The computer device may bind a network address 192.168. 0.6 of the rendering machine 1, a grid sub-patch 1, and a picture viewport 1 of the rendering machine 1. The computer device may bind a network address 192.168. 0.7 of the rendering machine 2, a grid sub-patch 2, and a picture viewport 2 of the rendering machine 2, so that a video sub-picture corresponding to the grid sub-patch 1 is rendered by the rendering machine 1, and a video sub-picture corresponding to the grid sub-patch 2 is rendered by the rendering machine 2. The picture viewport corresponds to the rendering machine. The rendering machine corresponds to the video sub-picture obtained through splitting. The picture viewport is configured to display a rendering sub-picture obtained by rendering the corresponding video sub-picture.

In some embodiments, modeling is performed through the physical size of the virtual sensor and the quantity of rendering machines to obtain the plurality of grid sub-patches, so that each rendering machine can be responsible for rendering a video sub-picture corresponding to a corresponding grid sub-patch, thereby improving rendering efficiency of the video sub-picture.

In some embodiments, the plurality of rendering machines include one primary rendering machine and at least one secondary rendering machine, and a synchronization card is deployed in the primary rendering machine, and the synchronously rendering the plurality of video sub-pictures through the plurality of preset rendering machines, to obtain rendering sub-pictures corresponding to the plurality of video sub-pictures includes: receiving, through the synchronization card in the primary rendering machine, a synchronization rendering signal generated by a synchronization signal generator based on a preset frame rate; synchronizing the synchronization rendering signal to the secondary rendering machine through the synchronization card; and controlling, by using the synchronization rendering signal received by the primary rendering machine and the secondary rendering machine separately, the primary rendering machine and the secondary rendering machine to synchronously render the plurality of video sub-pictures respectively, to obtain the rendering sub-pictures respectively corresponding to the plurality of video sub-pictures.

The synchronization rendering signal is a synchronization signal configured for indicating the plurality of rendering machines to synchronously render the plurality of video sub-pictures. The synchronization signal generator is a phase synchronization signal generator. The plurality of rendering machines may implement phase-level time alignment based on the synchronization rendering signal. The preset frame rate is a preset frame rate that may be set as required. In a frame rate range perceptible to naked eyes, a higher preset frame rate indicates higher quality and a higher requirement on hardware performance.

The plurality of rendering machines include one primary rendering machine and at least one secondary rendering machine, where the synchronization card is deployed in the primary rendering machine. The synchronization signal generator is further deployed in the computer device. The synchronization signal generator may generate the synchronization rendering signal based on the preset frame rate.

The computer device may receive, through the synchronization card in the primary rendering machine, the synchronization rendering signal generated by the synchronization signal generator based on the preset frame rate. The primary rendering machine may synchronize the synchronization rendering signal to each secondary rendering machine through the synchronization card. Further, the computer device may control, by using the synchronization rendering signal received by the primary rendering machine and the secondary rendering machine separately and the rendering instruction transmitted by the primary rendering machine, the primary rendering machine and the secondary rendering machine to respectively synchronously render the plurality of video sub-pictures, to obtain the rendering sub-pictures respectively corresponding to the plurality of video sub-pictures.

In some embodiments, the synchronization rendering signal generated by the synchronization signal generator based on the preset frame rate is received through the synchronization card in the primary rendering machine, and the synchronization rendering signal is synchronized to the secondary rendering machine through the synchronization card, so that the rendering machines may receive the same synchronization rendering signal. Further, the primary rendering machine and the secondary rendering machine are controlled to respectively synchronously render the plurality of video sub-pictures by using the synchronization rendering signal received by the primary rendering machine and the secondary rendering machine separately and the rendering instruction transmitted by the primary rendering machine, to obtain the rendering sub-pictures respectively corresponding to the plurality of video sub-pictures, so that a problem of video picture tearing can be avoided, thereby further improving quality of a final rendering video picture.

In some embodiments, the synthesizing the rendering sub-pictures respectively corresponding to the plurality of video sub-pictures, to obtain the rendering picture corresponding to the video frame picture includes: when a video signal acquisition card receives a synchronization acquisition signal generated by the synchronization signal generator, performing, through the video signal acquisition card, synchronous acquisition on rendering sub-picture signals respectively corresponding to the plurality of video sub-pictures; and synthesizing the rendering sub-picture signals acquired synchronously, to obtain the rendering picture corresponding to the video frame picture.

The rendering sub-picture corresponds to a rendering sub-picture signal. The synchronization acquisition signal is a synchronization signal configured for indicating the plurality of video signal acquisition cards to perform synchronous acquisition on the plurality of rendering sub-picture signals. The video signal acquisition card is further deployed on the computer device.

The synchronization signal generator may generate the synchronization acquisition signal based on the preset frame rate, and the video signal acquisition card may receive the synchronization acquisition signal generated by the synchronization signal generator. When the video signal acquisition card receives the synchronization acquisition signal generated by the synchronization signal generator, the computer device performs synchronous acquisition on the rendering sub-picture signals respectively corresponding to the plurality of video sub-pictures through the video signal acquisition card. Further, the computer device may synthesize the rendering sub-picture signals corresponding to the plurality of video sub-pictures acquired synchronously, to obtain the rendering picture corresponding to the video frame picture.

In some embodiments, when the video signal acquisition card receives the synchronization acquisition signal generated by the synchronization signal generator, synchronous acquisition is performed on the rendering sub-picture signals respectively corresponding to the plurality of video sub-pictures through the video signal acquisition card, and synthesis is performed on the rendering sub-picture signals corresponding to the plurality of rendering sub-picture signals acquired synchronously, to obtain the rendering picture corresponding to the video frame picture. The synchronous acquisition is performed on the plurality of rendering sub-picture signals, and the synthesis is performed on the rendering sub-picture signals acquired synchronously, so that the problem of the video picture tearing can be avoided, thereby further improving the quality of the final rendering video picture.

In some embodiments, the video picture rendering method further includes: when a signal format of the rendering sub-picture signal obtained through synchronous rendering is not consistent with a signal format specified by the video signal acquisition card, after a synchronization conversion signal is received through the format converter, performing, through a format converter, format synchronization conversion on the rendering sub-picture signals respectively corresponding to the plurality of video sub-pictures, to obtain the rendering sub-picture signals whose signal formats are consistent with the signal format specified by the video signal acquisition card, to enable the video signal acquisition card to perform synchronous acquisition.

The synchronization conversion signal is a synchronization signal configured for indicating a plurality of format converters to perform format synchronization conversion on the plurality of rendering sub-picture signals.

The plurality of format converters are further deployed on the computer device, and a quantity of format converters may be consistent with the quantity of rendering machines. The synchronization signal generator generates the synchronization conversion signal based on the preset frame rate, and the format converter may receive the synchronization conversion signal generated by the synchronization signal generator. When the signal formats of the rendering sub-picture signals obtained by synchronously rendered by the primary rendering machine and the secondary rendering machine are inconsistent with the signal format specified by the video signal acquisition card, after the synchronization conversion signal is received through the format converter, the computer device may perform the format synchronization conversion on the rendering sub-picture signals respectively corresponding to the plurality of video sub-pictures through the format converter, to obtain the rendering sub-picture signals whose signal formats are consistent with the signal format specified by the video signal acquisition card, to enable the video signal acquisition card to perform synchronous acquisition.

In some embodiments, the quantity of format converters is consistent with the quantity of rendering machines, and each format converter is responsible for performing conversion processing on a rendering sub-picture signal outputted by a corresponding rendering machine. The computer device may perform the format synchronization conversion on the rendering sub-picture signals respectively corresponding to the plurality of video sub-pictures through each format converter, to obtain the rendering sub-picture signals whose signal formats are consistent with the signal format specified by the video signal acquisition card, to enable the video signal acquisition card to perform synchronous acquisition.

In some embodiments, the signal formats of the rendering sub-picture signals outputted by the rendering machines are high definition multimedia interface (HDMI) formats, and the signal format specified by the video signal acquisition card is a serial digital interface (SDI) format. In some embodiments, after the synchronization conversion signal is received through the format converter, the computer device may perform the format synchronization conversion on the rendering sub-picture signals respectively corresponding to the plurality of video sub-pictures in the HDMI formats through the format converter, to obtain the rendering sub-picture signals whose formats are consistent with the SDI format specified by the video signal acquisition card, to enable the video signal acquisition card to perform synchronous acquisition.

In some embodiments, if the signal formats of the rendering sub-picture signals outputted by the rendering machines are DP (display port) formats, and the signal format specified by the video signal acquisition card is the SDI format, after the synchronization conversion signal is received through the format converter, the computer device may perform the format synchronization conversion on the rendering sub-picture signals respectively corresponding to the plurality of video sub-pictures in the DP formats through the format converter, to obtain the rendering sub-picture signals whose formats are consistent with the SDI format specified by the video signal acquisition card, to enable the video signal acquisition card to perform synchronous acquisition.

In some embodiments, when the signal formats of the rendering sub-picture signals obtained by synchronously rendered by the primary rendering machine and the secondary rendering machine are inconsistent with the signal format specified by the video signal acquisition card, after the synchronization conversion signal is received through the format converter, the format synchronization conversion is performed on the rendering sub-picture signals respectively corresponding to the plurality of video sub-pictures through the format converter, to obtain the rendering sub-picture signals whose signal formats are consistent with the signal format specified by the video signal acquisition card, to enable the video signal acquisition card to perform synchronous acquisition. The format synchronization conversion is performed on the plurality of rendering sub-picture signals, the synchronous acquisition is performed on the rendering sub-picture signals synchronously converted, and the rendering sub-picture signals acquired synchronously are synthesized, so that the problem of the video picture tearing can be further avoided, thereby further improving the quality of the final rendering video picture.

In some embodiments, the video signal acquisition card is deployed on the picture synthesizer, and the picture synthesizer provides a synthetic video canvas; and the synthesizing rendering sub-picture signals acquired synchronously, to obtain a rendering picture corresponding to the video frame picture includes: setting a frame rate of the synthetic video canvas to the preset frame rate; and synchronously synthesizing, by using the synthetic video canvas meeting the preset frame rate, the rendering sub-picture signals acquired synchronously, to obtain the rendering picture corresponding to the video frame picture.

The picture synthesizer is further deployed on the computer device, and the video signal acquisition card, synthetic software, and the synthetic video canvas created based on the synthetic software are deployed on the picture synthesizer. The computer device may set the frame rate of the synthetic video canvas to the same preset frame rate as the synchronization signal generator. Further, the computer device may synchronously synthesize, by using the synthetic video canvas meeting the preset frame rate, the rendering sub-picture signals respectively corresponding to the plurality of video sub-pictures synchronously acquired by the video signal acquisition card, to obtain the rendering picture corresponding to the video frame picture.

In some embodiments, the frame rate of the synthetic video canvas is set to the same preset frame rate as the synchronization signal generator, and the rendering sub-picture signals respectively corresponding to the plurality of video sub-pictures synchronously acquired by the video signal acquisition card are synchronously synthesized by using the synthetic video canvas meeting the preset frame rate, to obtain the rendering picture corresponding to the video frame picture, so that the problem of the video picture tearing can be further avoided, thereby further improving the quality of the final rendering video picture.

In some embodiments, the synchronization signal generator may generate a synchronization signal. When the synchronization signal generated by the synchronization signal generator is received by the rendering machine, the synchronization signal is a synchronization rendering signal. When the synchronization signal generated by the synchronization signal generator is received by the format converter, the synchronization signal is a synchronization conversion signal. When the synchronization signal generated by the synchronization signal generator is received by the video signal acquisition card, the synchronization signal is a synchronization acquisition signal. The synchronization signal generator is a phase synchronization signal generator. A plurality of systems may implement the phase-level time alignment based on the received synchronization signal.

Figure 8:
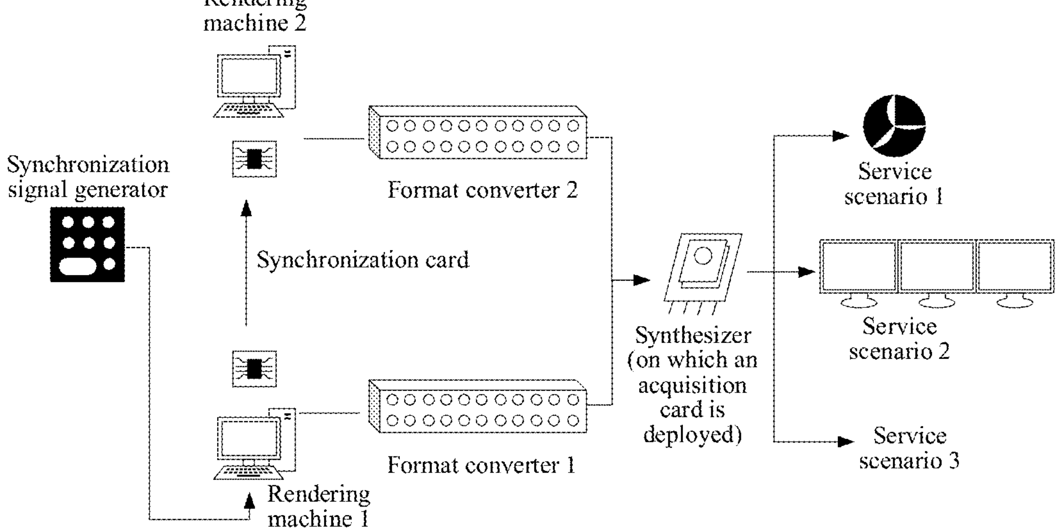
FIG. 8 is a schematic diagram of a hardware environment constructed for video picture rendering according to some embodiments.

In some embodiments, as shown in FIG. 8, the computer device is integrated with the synchronization signal generator, two rendering machines (for example, the rendering machine 1 and the rendering machine 2), two format converters (for example, a format converter 1 and a format converter 2), and the picture synthesizer on which the video signal acquisition card is deployed. The rendering machine 1 is integrated with the synchronization card. The synchronization signal generator may generate the synchronization rendering signal, the synchronization conversion signal, and the synchronization acquisition signal. The plurality of video sub-pictures are two video sub-pictures. The rendering machine I may receive, through the synchronization card, the synchronization rendering signal generated by the synchronization signal generator, and synchronize the synchronization rendering signal to the rendering machine 2. The rendering machine 1 and the rendering machine 2 are controlled, by using the synchronization rendering signal received by the rendering machine 1 and the rendering machine 2 separately, to respectively synchronously render the two video sub-pictures, to obtain the rendering sub-picture signals respectively corresponding to the two video sub-pictures. When the signal formats of the rendering sub-picture signals obtained by synchronously rendered by the rendering machine 1 and the rendering machine 2 are inconsistent with the signal format specified by the video signal acquisition card, the format conversion is performed on the rendering sub-picture signal outputted by the rendering machine 1 through the format converter 1, and the format conversion is performed on the rendering sub-picture signal outputted by the rendering machine 2 through the format converter 2, to obtain the rendering sub-picture signals whose signal formats are consistent with the signal format specified by the video signal acquisition card. When the video signal acquisition card receives the synchronization acquisition signal generated by the synchronization signal generator, the synchronous acquisition is performed on the rendering sub-picture signals respectively corresponding to the two video sub-pictures through the video signal acquisition card, and the synthesis is performed on the rendering sub-picture signals respectively corresponding to the two video sub-pictures synchronously acquired, to obtain the rendering picture corresponding to the video frame picture. The outputted rendering picture may be applied to a plurality of service scenarios.

Figure 9:
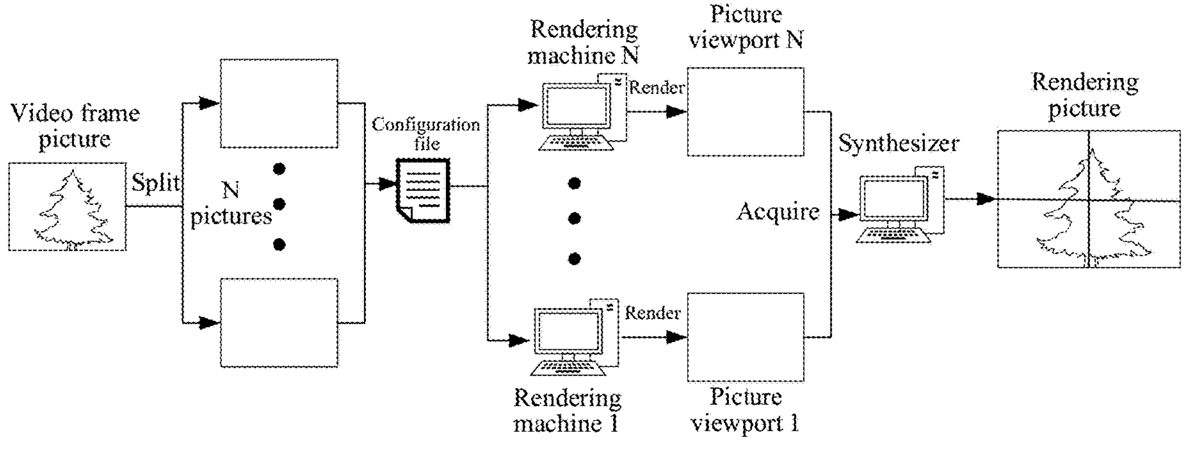
FIG. 9 is a schematic flowchart of a video picture rendering method according to some embodiments.

In some embodiments, as shown in FIG. 9, the computer device may determine the rendering region based on a relative position between the viewpoint of the simulated camera and each vertex of the grid patch, and determine the to-be-rendered real-time video frame picture in the rendering region based on the position of the simulated camera. For each video frame picture, the computer device may spatially perform regional splitting on the video frame picture based on the grid patch, to obtain N video sub-pictures. The computer device may synchronously render the N video sub-pictures through N preset rendering machines, to obtain rendering sub-pictures respectively corresponding to the N video sub-pictures. Further, the computer device may synthesize the rendering sub-pictures respectively corresponding to the N video sub-pictures by using the picture synthesizer, to obtain the rendering picture corresponding to the video frame picture. N is a positive integer greater than 2, and is a constant.

In some embodiments, in a virtual object real-time rendering scenario, the video frame picture includes a virtual object real-time picture, and the video sub-picture includes a real-time sub-picture. The obtaining a to-be-rendered video frame picture in the rendering region includes: obtaining the position of the simulated camera, and determining the to-be-rendered real-time virtual object real-time picture in the rendering region based on the position of the simulated camera; and the synthesizing the rendering sub-pictures respectively corresponding to the plurality of video sub-pictures, to obtain the rendering picture corresponding to the video frame picture includes: synthesizing the rendering sub-pictures respectively corresponding to the plurality of real-time sub-pictures, to obtain the rendering picture corresponding to the virtual object real-time picture.

In some embodiments, the determining the to-be-rendered video frame picture in the rendering region based on a position of the virtual camera includes: determining the to-be-rendered real-time virtual object real-time picture in the rendering region based on the position of the simulated camera.

The virtual object real-time picture is a video picture determined in the virtual object real-time rendering scenario. The real-time sub-picture is a video picture obtained by spatially perform regional splitting on the virtual object real-time picture. The virtual object is a virtual entity object, and may include at least one of a virtual character, a virtual animal, and a virtual object.

The computer device may determine the rendering region based on the relative position between the viewpoint of the simulated camera and each vertex of the grid patch. In the virtual object real-time rendering scenario, the computer device may determine the to-be-rendered real-time virtual object real-time picture in the rendering region based on the position of the simulated camera. For each virtual object real-time picture, the computer device may spatially perform regional splitting on the virtual object real-time picture based on the grid patch, to obtain a plurality of real-time sub-pictures, and perform, through a plurality of preset rendering machines, synchronous rendering on the plurality of real-time sub-pictures, to obtain rendering sub-pictures respectively corresponding to the plurality of real-time sub-pictures. Further, the computer device may synthesize the rendering sub-pictures respectively corresponding to the plurality of real-time sub-pictures, to obtain the rendering picture corresponding to the virtual object real-time picture.

In some embodiments, in the virtual object real-time rendering scenario, the to-be-rendered real-time virtual object real-time picture in the rendering region is determined through the position of the simulated camera, so that an accuracy rate of obtaining the virtual object real-time picture may be improved. The rendering sub-pictures respectively corresponding to the plurality of real-time sub-pictures are synthesized to obtain the rendering picture corresponding to the virtual object real-time picture, to improve instruction of the rendering picture in the virtual object real-time rendering scenario.

Figure 10:
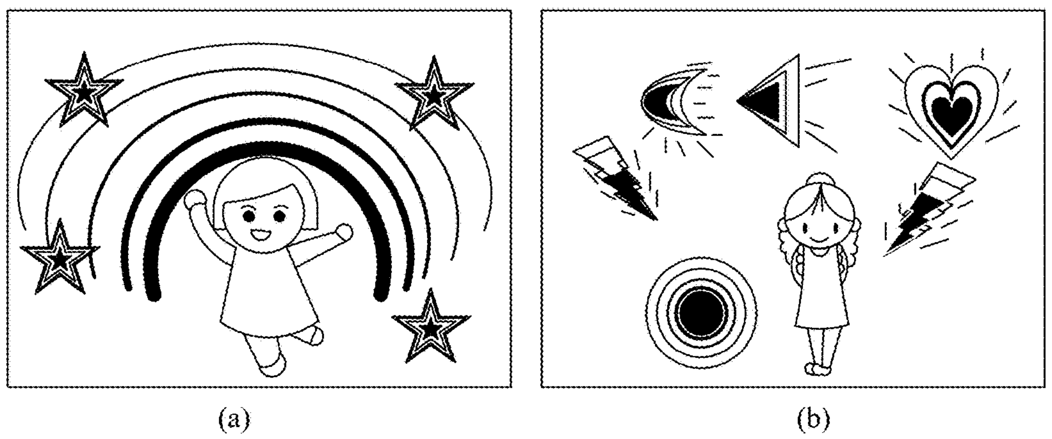
FIG. 10 is a schematic diagram of an application scenario of a video picture rendering method according to some embodiments.

In some embodiments, as shown in FIG. 10, there are a large quantity of complex scenario elements in both a scenario (a) and a scenario (b), for example, light and hair. If pictures in the scenario (a) and the scenario (b) are rendered through a single rendering machine, rendering pressure of the rendering machine is high. Therefore, through the video picture rendering method according to some embodiments, the rendering region is determined based on the relative position between the viewpoint of the simulated camera and each vertex of the grid patch, and the to-be-rendered real-time video frame picture in the rendering region is determined based on the position of the simulated camera. Because the simulated camera is obtained by simulating the virtual camera in the rendering engine, and the grid patch is a patch that is constructed based on a physical size of a virtual sensor in the virtual camera and may be used for picture splitting. Therefore, for each video frame picture, regional splitting is spatially performed on the video frame picture based on the grid patch, to obtain the plurality of video sub-pictures. The synchronous rendering is performed on the plurality of video sub-pictures through the plurality of preset rendering machines, to obtain the rendering sub-pictures respectively corresponding to the plurality of video sub-pictures, and the synthesis is performed on the rendering sub-pictures respectively corresponding to the plurality of video sub-pictures, to obtain the rendering picture corresponding to the video frame picture. Compared with offline rendering techniques, in some embodiments, regional splitting is spatially performed on the video frame picture through the grid patch constructed based on the physical size of the virtual sensor in the virtual camera, the sub-pictures obtained through splitting are synchronously rendered by the plurality of rendering machines, and the rendering pressure is allocated to the plurality of rendering machines, so that high-quality real-time video pictures can be obtained, thereby meeting a requirement of a real-time video picture on a rendering scenario.

Figure 11:
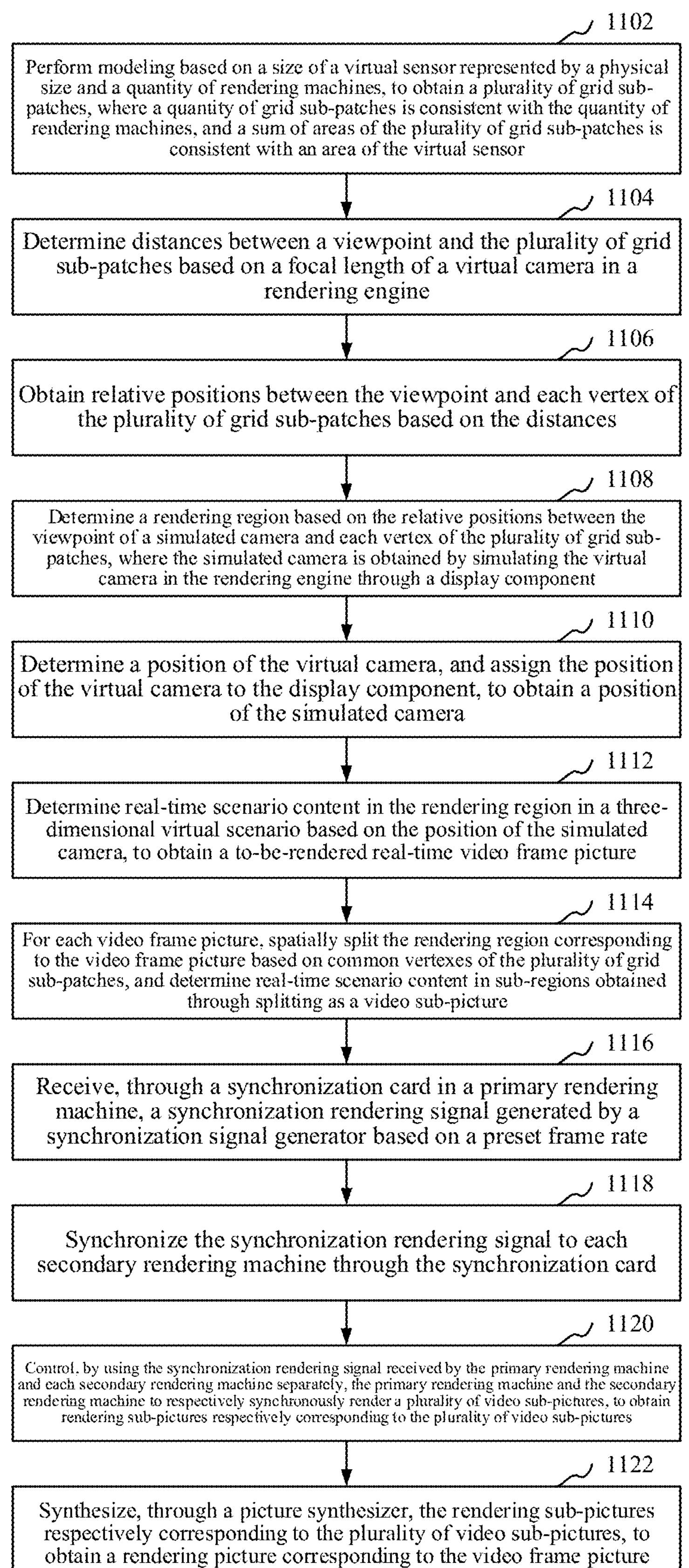
FIG. 11 is a schematic flowchart of a video picture rendering method according to some embodiments.

As shown in FIG. 11, in some embodiments, a video picture rendering method is provided. The method may be applied to a computer device. The computer device may be a terminal or a server, and the method is separately performed by the terminal or the server, or may be implemented through interaction between the terminal and the server. Some embodiments are described by using an example in which the method is applied to a computer device. The method includes the following operations:

Operation 1102: Perform modeling based on a size of a virtual sensor represented by a physical size and a quantity of rendering machines, to obtain a plurality of grid sub-patches, where a quantity of grid sub-patches is consistent with the quantity of rendering machines, and a sum of areas of the plurality of grid sub-patches is consistent with an area of the virtual sensor.

Operation 1104: Determine distances between a viewpoint and the plurality of grid sub-patches based on a focal length of a virtual camera in a rendering engine.

Operation 1106: Obtain relative positions between the viewpoint and each vertex of the plurality of grid sub-patches based on the distances.

Operation 1108: Determine a rendering region based on the relative positions between the viewpoint of a simulated camera and each vertex of the plurality of grid sub-patches, where the simulated camera is obtained by simulating the virtual camera in the rendering engine through a display component.

Operation 1110: Determine a position of the virtual camera, and assign the position of the virtual camera to the display component, to obtain a position of the simulated Operation 1112: Determine real-time scenario content in the rendering region in a three-dimensional virtual scenario based on the position of the simulated camera, to obtain a to-be-rendered real-time video frame picture.

Operation 1114: For each video frame picture, spatially split the rendering region corresponding to the video frame picture based on common vertexes of the plurality of grid sub-patches, and determine real-time scenario content in sub-regions obtained through splitting as a video sub-picture.

Operation 1116: Receive, through a synchronization card in a primary rendering machine, a synchronization rendering signal generated by a synchronization signal generator based on a preset frame rate.

Operation 1118: Synchronize the synchronization rendering signal to each secondary rendering machine through the synchronization card.

Operation 1120: Control, by using the synchronization rendering signal received by the primary rendering machine and each secondary rendering machine separately, the primary rendering machine and the secondary rendering machine to respectively synchronously render a plurality of video sub-pictures, to obtain rendering sub-pictures respectively corresponding to the plurality of video sub-pictures.

Operation 1122: Synthesize, through a picture synthesizer, the rendering sub-pictures respectively corresponding to the plurality of video sub-pictures, to obtain a rendering picture corresponding to the video frame picture.

Further provided is an application scenario. The video picture rendering method is applied to the application scenario. The video picture rendering method may be applied to a video picture rendering scenario for live streaming of a virtual object. The computer device may perform modeling based on a size of a virtual sensor represented by a physical size and a quantity of rendering machines, to obtain a plurality of grid sub-patches, where a quantity of grid sub-patches is consistent with the quantity of rendering machines, and a sum of areas of the plurality of grid sub-patches is consistent with an area of the virtual sensor. Distances between a viewpoint and the plurality of grid sub-patches are determined based on a focal length of a virtual camera in a rendering engine. Relative positions between the viewpoint and each vertex of the plurality of grid sub-patches are obtained based on the distances. A rendering region is determined based on the relative positions between the viewpoint of the simulated camera and each vertex of the plurality of grid sub-patches, where the simulated camera is obtained by simulating the virtual camera in the rendering engine through a display component. A position of the virtual camera is determined, and the position of the virtual camera is assigned to the display component, to obtain a position of the simulated camera. Real-time scenario content in the rendering region in a three-dimensional virtual scenario is determined based on the position of the simulated camera, to obtain a to-be-rendered real-time virtual object live streaming picture.

For each virtual object live streaming picture, the computer device may spatially split a rendering region corresponding to the virtual object live streaming picture based on common vertexes of the plurality of grid sub-patches, and determine real-time scenario content in sub-regions obtained through splitting as a live streaming sub-picture. A synchronization rendering signal generated based on a preset frame rate by a synchronization signal generator is received through a synchronization card in a primary rendering machine. The synchronization rendering signal is synchronized to each secondary rendering machine through the synchronization card. The primary rendering machine and the secondary rendering machine are controlled to respectively synchronously render a plurality of live streaming sub-pictures by using the synchronization rendering signal received by the primary rendering machine and each secondary rendering machine separately, to obtain rendering sub-pictures respectively corresponding to the plurality of live streaming sub-pictures. The rendering sub-pictures respectively corresponding to the plurality of live streaming sub-pictures are synthesized, to obtain the rendering picture corresponding to the virtual object live streaming picture. Regional splitting may be spatially performed on the virtual object live streaming picture through the grid patch constructed based on the physical size of the virtual sensor in the virtual camera, the live streaming sub-pictures obtained through splitting are synchronously rendered by the plurality of rendering machines, so that high-quality real-time virtual object live streaming pictures can be obtained, thereby meeting a requirement of a real-time virtual object live streaming picture on a rendering scenario.

Further provided is an application scenario. The video picture rendering method is applied to the application scenario. The video picture rendering method may be applied to a video picture rendering scenario for extended reality (XR) live streaming. The extended reality (XR) refers to combining real and virtual by a computer to create a man-machine interactive virtual environment, which can bring a sense of immersion to an experiencer in which a virtual world and a real world transition seamlessly. Through the video picture rendering method in some embodiments, regional splitting is spatially performed on an extended reality live streaming picture through the grid patch constructed based on the virtual sensor represented by a physical size in the virtual camera, the live streaming sub-pictures obtained through splitting arc synchronously rendered by the plurality of rendering machines, so that a high-quality real-time extended reality live streaming picture can be obtained, thereby meeting a requirement of the real-time extended reality live streaming picture on a rendering scenario.

Although the operations in the flowcharts of some embodiments are sequentially displayed in sequence, the operations are not necessarily performed in sequence. Unless otherwise explicitly indicated, these operations are not performed in a strictly limited sequence, and the operations may be performed in another sequence. In addition, at least some operations in some embodiments may include a plurality of sub-operations or a plurality of stages, and these sub-operations or stages are not necessarily performed at a same moment, and may be performed at different moments. The sub-operations or stages are not necessarily performed in sequence, and the sub-operations or stages and at least some of other operations or sub-operations or stages of other operations may be performed repeatedly or alternately.

Figure 12:
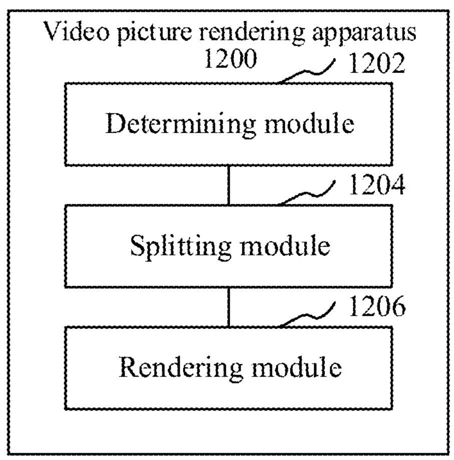
FIG. 12 is a block diagram of a structure of a video picture rendering apparatus according to some embodiments.

In some embodiments, as shown in FIG. 12, a video picture rendering apparatus 1200 is provided. The apparatus may use a software module or a hardware module, or a combination thereof as a part of a computer device. The apparatus may include:

a determining module 1202, configured to determine a simulated camera, the simulated camera being obtained by simulating a virtual camera of a rendering engine; determine a grid patch, a size of the grid patch matching a size of a virtual sensor in the virtual camera; determine a positional relationship between a viewpoint of the simulated camera and each vertex of the grid patch, and determine a rendering region based on the positional relationship; and obtain a to-be-rendered video frame picture in the rendering region;

a splitting module 1204, configured to split the video frame picture based on the grid patch, to obtain a plurality of video sub-pictures; and a rendering module 1206, configured to synchronously render the plurality of video sub-pictures through a plurality of rendering machines, to obtain a rendering picture corresponding to the video frame picture.

In some embodiments, the rendering region is a region inside a pyramid when the viewpoint is respectively connected to each vertex of the grid patch to form the pyramid.

In some embodiments, the determining module 1202 is further configured to obtain a position of the simulated camera, and determine the to-be-rendered video frame picture in the rendering region based on a position of the virtual camera.

In some embodiments, the virtual camera is in the three-dimensional virtual scenario, the position of the simulated camera is determined based on the position of the virtual camera in the three-dimensional virtual scenario, and the determining module 1202 is further configured to determine the real-time scenario content in the rendering region in the three-dimensional virtual scenario based on the position of the simulated camera, to obtain the to-be-rendered real-time video frame picture.

In some embodiments, the grid patch includes a plurality of grid sub-patches, common vertexes of two adjacent grid sub-patches in the plurality of grid sub-patches have same coordinates, and the splitting module 1204 is further configured to spatially split, for each video frame picture, the rendering region corresponding to the video frame picture based on the common vertexes of the plurality of grid sub-patches, to obtain a plurality of sub-regions; and determine the real-time scenario content in each of the sub-regions in the three-dimensional virtual scenario, and determine the real-time scenario content in each of the sub-regions as the video sub-picture respectively.

In some embodiments, the determining module 1202 is further configured to determine a focal length of the virtual camera; determine a distance between the viewpoint of the simulated camera and the grid patch based on the focal length; and determine the positional relationship between the viewpoint and each vertex of the grid patch based on the distance.

In some embodiments, the simulated camera is obtained by simulating through the display component, and the determining module 1202 is further configured to determine the position of the virtual camera; and assign the position of the virtual camera to the display component, to obtain the position of the simulated camera.

In some embodiments, the rendering module 1206 is further configured to synchronously render the plurality of video sub-pictures through the plurality of preset rendering machines, to obtain rendering sub-pictures corresponding to the plurality of video sub-pictures. The video picture rendering apparatus 1200 further includes a synthetic module configured to synthesize the rendering sub-pictures respectively corresponding to the plurality of video sub-pictures, to obtain the rendering picture corresponding to the video frame picture.

The size of the virtual sensor is represented by using the physical size, and the video picture rendering apparatus 1200 further includes a construction module configured to perform modeling based on the size of the virtual sensor and the quantity of rendering machines, to obtain the plurality of grid sub-patches.

In some embodiments, a quantity of grid sub-patches is consistent with the quantity of rendering machines, and a sum of areas of the plurality of grid sub-patches is consistent with an area of the virtual sensor.

In some embodiments, the plurality of rendering machines include one primary rendering machine and at least one secondary rendering machine, a synchronization card is deployed in the primary rendering machine, and the rendering module 1206 is further configured to receive, through the synchronization card in the primary rendering machine, a synchronization rendering signal generated by a synchronization signal generator based on a preset frame rate; synchronize the synchronization rendering signal to the secondary rendering machine through the synchronization card; and control, by using the synchronization rendering signal received by the primary rendering machine and the secondary rendering machine separately, the primary rendering machine and the secondary rendering machine to synchronously render the plurality of video sub-pictures respectively, to obtain the rendering sub-pictures respectively corresponding to the plurality of video sub-pictures.

In some embodiments, the rendering module 1206 is further configured to perform, when the video signal acquisition card receives the synchronization acquisition signal generated by the synchronization signal generator, the synchronous acquisition on the rendering sub-picture signals respectively corresponding to the plurality video sub-pictures; and synthesize the rendering sub-picture signals acquired synchronously, to obtain the rendering picture corresponding to the video frame picture.

In some embodiments, the video picture rendering apparatus 1200 further includes a conversion module configured to: when a signal format of the rendering sub-picture signal obtained through synchronous rendering is not consistent with a signal format specified by the video signal acquisition card, after a synchronization conversion signal is received through the format converter, perform, through the format converter, format synchronization conversion on the rendering sub-picture signals respectively corresponding to the plurality of video sub-pictures, to obtain the rendering sub-picture signals whose signal formats are consistent with the signal format specified by the video signal acquisition card, to enable the video signal acquisition card to perform the synchronous acquisition.

In some embodiments, the video signal acquisition card is deployed on a picture synthesizer, the picture synthesizer provides a synthetic video canvas, and the synthetic module is further configured to set a frame rate of the synthetic video canvas to the preset frame rate; and synchronously synthesize, by using the synthetic video canvas meeting the preset frame rate, the rendering sub-picture signals acquired synchronously, to obtain the rendering picture corresponding to the video frame picture.

In some embodiments, in a virtual object real-time rendering scenario, the video frame picture includes a virtual object real-time picture, and the video sub-picture includes a real-time sub-picture. The determining module 1202 is further configured to determine the to-be-rendered real-time virtual object real-time picture in the rendering region based on the position of the simulated camera. The synthetic module is further configured to synthesize the rendering sub-pictures respectively corresponding to the plurality of real-time sub-pictures, to obtain the rendering picture corresponding to the virtual object real-time picture.

The video picture rendering apparatus splits the video frame picture through the grid patch whose size matching the size of the virtual sensor in the virtual camera, and the sub-pictures obtained through splitting are rendered synchronously through the plurality of preset rendering machines, so that a high-quality rendering picture can be obtained efficiently, thereby meeting a rendering requirement on a scenario with high picture quality and rendering efficiency. For example, when the video picture rendering method is used, compared with other methods, a larger picture size may have a more prominent effect. For a scenario having a high requirement on real-time performance, such as a scenario in which a real-time video picture is rendered, the high requirement on real-time performance of the video picture rendering may be met by using the video picture rendering method. For a screen arranged inside or outside a building site, for example, a commercial giant screen, an effect is prominent by using the video picture rendering method.

According to some embodiments, each module may exist respectively or be combined into one or more modules. Some modules may be further split into multiple smaller function subunits, thereby implementing the same operations without affecting the technical effects of some embodiments. The modules are divided based on logical functions. In actual applications, a function of one module may be realized by multiple modules, or functions of multiple modules may be realized by one module. In some embodiments, the apparatus may further include other modules. In actual applications, these functions may also be realized cooperatively by the other modules, and may be realized cooperatively by multiple modules.

A person skilled in the art would understand that these “modules” could be implemented by hardware logic, a processor or processors executing computer software code, or a combination of both. The “modules” may also be implemented in software stored in a memory of a computer or a non-transitory computer-readable medium, where the instructions of each module are executable by a processor to thereby cause the processor to perform the respective operations of the corresponding module.

In some embodiments, a computer device is provided. The computer device may be a server or a terminal, and an internal structure diagram thereof may be shown in FIG. 13. The computer device includes a processor, a memory, an input/output (I/O for short) interface, and a communication interface. The processor, the memory, and the input/output interface are connected through a system bus, and the communication interface is connected to the system bus through the input/output interface. The processor of the computer device is configured to provide calculation and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The I/O interface of the computer device is configured to exchange information between the processor and an external device. The communication interface of the computer device is configured to connect to and communicate with an external terminal through a network. When the computer-readable instructions are executed by the processor, a video picture rendering method is implemented.

Figure 13:
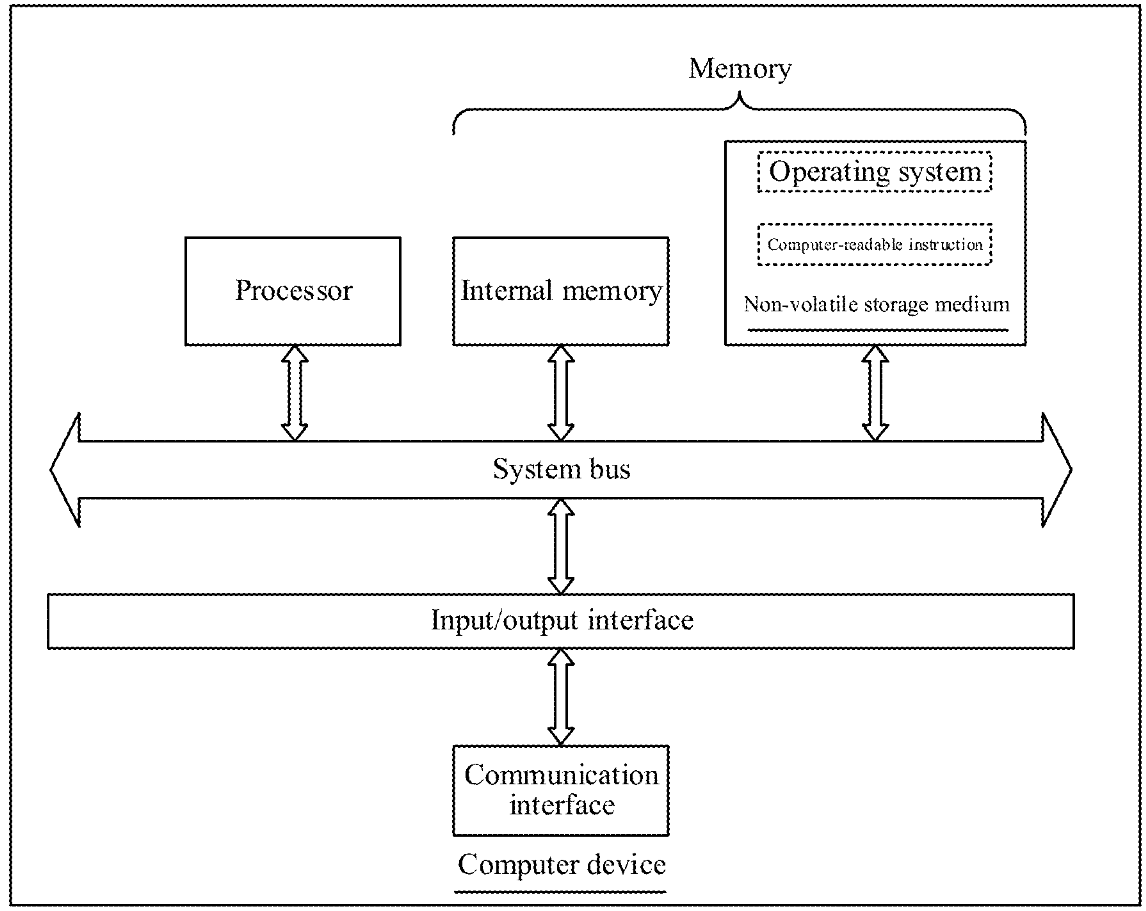
FIG. 13 is a diagram of an internal structure of a computer device according to some embodiments.

A person skilled in the art may understand that the structure shown in FIG. 13 is a block diagram of a partial structure and does not limit the computer device. The computer device may include more or fewer components than those in the figure, or some components may be combined, or a different component deployment may be used.

In some embodiments, a computer device is further provided, including a memory and a processor, the memory having computer-readable instructions stored therein, the processor, when executing the computer-readable instructions, being used for implementing the operations in the method according to some embodiments.

In some embodiments, a computer-readable storage medium is provided, the computer-readable storage medium having computer-readable instructions stored therein, the computer-readable instructions, when executed by a processor, causing the processor to implement the operations in the method according to some embodiments.

In some embodiments, a computer program product is provided, including computer-readable instructions, the computer-readable instructions, when executed by a processor, causing the processor to implement the operations in the method according to some embodiments.

User information (including but not limited to user device information, user personal information, and the like) and data (including but not limited to data for analysis, stored data, displayed data, and the like) are information and data authorized by users or authorized by all parties, and collection, use, and processing of relevant data should comply with relevant laws, regulations, and standards of relevant countries and regions.

A person of ordinary skill in the art may understand that some or all procedures in the method in some embodiments may be implemented by computer-readable instructions instructing related hardware, the computer-readable instructions may be stored in a non-volatile computer readable storage medium, and when the computer-readable instructions are executed, the procedures in the method according to some embodiments may be implemented. Any reference to a memory, a storage, a database, or another medium used in some embodiments may include at least one of a non-volatile memory and a volatile memory. The non-volatile memory may include a read only memory (ROM), a magnetic tape, a floppy disk, a flash memory, optical storage, and the like. The volatile memory may include a random access memory (RAM) or an external cache. By way of description rather than limitation, the RAM may be in various forms, for example, a static random access memory (SRAM), a dynamic random access memory (DRAM), or the like.

The foregoing embodiments are used for describing, instead of limiting the technical solutions of the disclosure. A person of ordinary skill in the art shall understand that although the disclosure has been described in detail with reference to some embodiments, modifications can be made to the technical solutions described in some embodiments, or equivalent replacements can be made to some technical features in the technical solutions, provided that such modifications or replacements do not cause the essence of corresponding technical solutions to depart from the spirit and scope of the technical solutions of the foregoing embodiments of the disclosure and the appended claims.

What is claimed is:

1. A video picture rendering method, performed by a computer device, comprising:

obtaining a simulated camera by simulating a virtual camera of a rendering engine;

determining a grid patch, a first size of the grid patch matching a second size of a virtual sensor in the virtual camera;

determining a positional relationship between a viewpoint of the simulated camera and a plurality of vertexes of the grid patch;

determining a rendering region based on the positional relationship;

obtaining a video frame picture to be rendered in the rendering region;

splitting the video frame picture based on the grid patch, to obtain a plurality of video sub-pictures; and synchronously rendering the plurality of video sub-pictures through a plurality of preset rendering machines, to obtain a rendering picture corresponding to the video frame picture.

2. The method according to claim 1, wherein the rendering region comprises a region inside a pyramid based on the viewpoint being connected to the plurality of vertexes to form the pyramid.

3. The method according to claim 1, wherein the obtaining the video frame picture comprises:

obtaining a first position of the simulated camera, and determining the video frame picture based on a second position of the virtual camera.

4. The method according to claim 3, wherein the virtual camera is in a three-dimensional virtual scenario, and the first position is determined based on the second position in the three-dimensional virtual scenario, and wherein the determining the video frame picture comprises:

determining first real-time scenario content in the rendering region in the three-dimensional virtual scenario based on the first position, to obtain the video frame picture.

5. The method according to claim 3, wherein the simulated camera is obtained by simulating through a display component, and the method further comprises:

determining the second position; and assigning the second position to the display component, to obtain the first position.

6. The method according to claim 4, wherein the grid patch comprises a plurality of grid sub-patches, common vertexes of two adjacent grid sub-patches in the plurality of grid sub-patches have same coordinates, and wherein the splitting the video frame picture comprises:

spatially splitting, for a plurality of video frame pictures, the rendering region corresponding to the video frame picture based on common vertexes of the plurality of grid sub-patches, to obtain a plurality of sub-regions; and determining second real-time scenario content in the plurality of sub-regions in the three-dimensional virtual scenario, and determining the second real-time scenario content as the plurality of video sub-pictures.

7. The method according to claim 6, wherein the second size is represented by using a physical size, and the method further comprises:

performing modeling based on the second size and a first quantity of rendering machines, to obtain the plurality of grid sub-patches.

8. The method according to claim 7, wherein a second quantity of grid sub-patches corresponds to the second quantity, and a sum of areas of the plurality of grid sub-patches corresponds to an area of the virtual sensor.

9. The method according to claim 1, wherein the method further comprises:

determining a focal length of the virtual camera;

determining a distance between the viewpoint of the simulated camera and the grid patch based on the focal length; and determining the positional relationship between the viewpoint and each vertex of the grid patch based on the distance.

10. The method according to claim 1, wherein the synchronously rendering the plurality of video sub-pictures comprises:

synchronously rendering the plurality of video sub-pictures through the plurality of preset rendering machines, to obtain rendering sub-pictures respectively corresponding to the plurality of video sub-pictures; and synthesizing the rendering sub-pictures respectively corresponding to the plurality of video sub-pictures, to obtain the rendering picture corresponding to the video frame picture.

11. A video picture rendering apparatus, comprising:

at least one memory configured to store computer program code; and at least one processor configured to read the program code and operate as instructed by the program code, the program code comprising:

first obtaining code configured to cause at least one of the at least one processor to obtain a simulated camera by simulating a virtual camera of a rendering engine;

first determining code configured to cause at least one of the at least one processor to determine a grid patch, a first size of the grid patch matching a second size of a virtual sensor in the virtual camera;

second determining code configured to cause at least one of the at least one processor to determine a positional relationship between a viewpoint of the simulated camera and a plurality of vertexes of the grid patch;

third determining code configured to cause at least one of the at least one processor to determine a rendering region based on the positional relationship;

second obtaining code configured to cause at least one of the at least one processor to obtain a video frame picture to be rendered in the rendering region;

splitting code configured to cause at least one of the at least one processor to split the video frame picture based on the grid patch, to obtain a plurality of video sub-pictures; and rendering code configured to cause at least one of the at least one processor to synchronously render the plurality of video sub-pictures through a plurality of preset rendering machines, to obtain a rendering picture corresponding to the video frame picture.

12. The video picture rendering apparatus according to claim 11, wherein the rendering region comprises a region inside a pyramid based on the viewpoint being connected to the plurality of vertexes to form the pyramid.

13. The video picture rendering apparatus according to claim 11, wherein the second obtaining code is configured to cause at least one of the at least one processor to obtain a first position of the simulated camera, and determine the video frame picture based on a second position of the virtual camera.

14. The video picture rendering apparatus according to claim 13, wherein the virtual camera is in a three-dimensional virtual scenario, and the first position is determined based on the second position in the three-dimensional virtual scenario, and wherein the second obtaining code is configured to cause at least one of the at least one processor to determine first real-time scenario content in the rendering region in the three-dimensional virtual scenario based on the first position, to obtain the video frame picture.

15. The video picture rendering apparatus according to claim 13, wherein the simulated camera is obtained by simulating through a display component, and wherein the program code further comprises assigning code configured to cause at least one of the at least one processor to:

determine the second position; and assign the second position to the display component, to obtain the first position.

16. The video picture rendering apparatus according to claim 14, wherein the grid patch comprises a plurality of grid sub-patches, common vertexes of two adjacent grid sub-patches in the plurality of grid sub-patches have same coordinates, and wherein the splitting code is configured to cause at least one of the at least one processor to:

spatially split, for a plurality of video frame pictures, the rendering region corresponding to the video frame picture based on common vertexes of the plurality of grid sub-patches, to obtain a plurality of sub-regions; and determine second real-time scenario content in the plurality of sub-regions in the three-dimensional virtual scenario, and determine the second real-time scenario content as the plurality of video sub-pictures.

17. The video picture rendering apparatus according to claim 16, wherein the second size is represented by using a physical size, and the program code further comprises performing code configured to cause at least one of the at least one processor to perform modeling based on the second size and a first quantity of rendering machines, to obtain the plurality of grid sub-patches.

18. The video picture rendering apparatus according to claim 11, wherein the program code further comprises fourth determining code configured to cause at least one of the at least one processor to:

determine a focal length of the virtual camera;

determine a distance between the viewpoint of the simulated camera and the grid patch based on the focal length; and determine the positional relationship between the viewpoint and each vertex of the grid patch based on the distance.

19. The video picture rendering apparatus according to claim 11, wherein the rendering code is configured to cause at least one of the at least one processor to:

synchronously render the plurality of video sub-pictures through the plurality of preset rendering machines, to obtain rendering sub-pictures respectively corresponding to the plurality of video sub-pictures; and synthesize the rendering sub-pictures respectively corresponding to the plurality of video sub-pictures, to obtain the rendering picture corresponding to the video frame picture.

20. A non-transitory computer-readable storage medium, storing computer code which, when executed by at least one processor, causes the at least one processor to at least:

obtain a simulated camera by simulating a virtual camera of a rendering engine;

determine a grid patch, a first size of the grid patch matching a second size of a virtual sensor in the virtual camera;

determine a positional relationship between a viewpoint of the simulated camera and a plurality of vertexes of the grid patch;

determine a rendering region based on the positional relationship;

obtain a video frame picture to be rendered in the rendering region;

split the video frame picture based on the grid patch, to obtain a plurality of video sub-pictures; and synchronously render the plurality of video sub-pictures, to obtain a rendering picture corresponding to the video frame picture.

* * * * *